United States Patent [19]

Giebel et al.

[11] 4,117,259
[45] Sep. 26, 1978

[54] CABLE SLEEVE

[75] Inventors: Wolfgang Giebel; Herbert Krause, both of Munich; Hans-Juergen Meltsch, Neu-Germering, all of Germany

[73] Assignee: Siemens Aktiengesellschaft, Berlin & Munich, Germany

[21] Appl. No.: 674,053

[22] Filed: Apr. 5, 1976

[30] Foreign Application Priority Data

Apr. 11, 1975 [DE] Fed. Rep. of Germany ....... 2515939

[51] Int. Cl.² .................... H02G 15/10; H02G 15/18
[52] U.S. Cl. ........................................ 174/92; 174/78
[58] Field of Search ............ 174/76, 77 R, 78, 87, 174/88 R, 91, 92, 93, 155, 156; 339/208, 251, 107

[56] References Cited

U.S. PATENT DOCUMENTS

| 1,685,420 | 9/1928 | Higham | 339/107 |
| 2,089,856 | 8/1937 | Reynolds | 339/107 |
| 3,375,481 | 3/1968 | Parnell | 339/107 X |
| 3,458,163 | 7/1969 | Egerton-Smith | 174/155 UX |
| 3,673,311 | 6/1972 | Misare | 174/88 R X |
| 3,823,254 | 7/1974 | Smith | 174/92 |
| 3,915,540 | 10/1975 | Thompson et al. | 174/78 X |
| 3,936,590 | 2/1976 | Albano | 174/92 |
| 4,002,818 | 1/1977 | Kunze | 174/92 X |

FOREIGN PATENT DOCUMENTS

| 611,700 | 4/1935 | Fed. Rep. of Germany | 174/92 |
| 11,193,131 | 5/1965 | Fed. Rep. of Germany | 174/92 |
| 1,440,082 | 2/1969 | Fed. Rep. of Germany | 174/92 |
| 164,946 | 6/1921 | United Kingdom | 339/251 |
| 1,324,177 | 7/1973 | United Kingdom | 174/92 |

*Primary Examiner*—Laramie E. Askin
*Attorney, Agent, or Firm*—Hill, Gross, Simpson, Van Santen, Steadman, Chiara & Simpson

[57] ABSTRACT

A cylindrical-shaped cable sleeve, made of a suitable plastic, is formed by mating two semi-circular sleeve portions. With suitable cables inserted through an opening at each end and spliced therein, the two sleeve portions are secured from separation by a suitable clamping device engaging longitudinal mating flanges running on the exterior surface on each side of each half portion. The cable splice is sealed within the sleeve by insertion of a suitable sealant which is prevented from leaking by a series of axially disposed sealing rings interfacing with the cable to form a joint.

3 Claims, 9 Drawing Figures

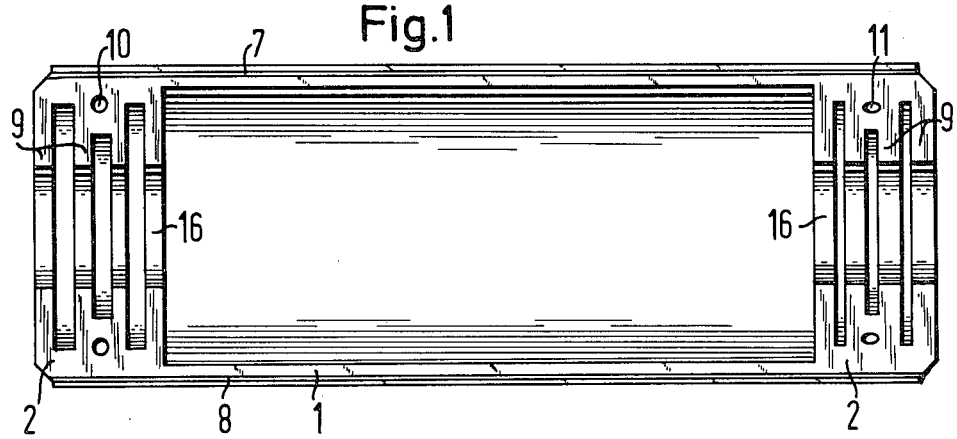
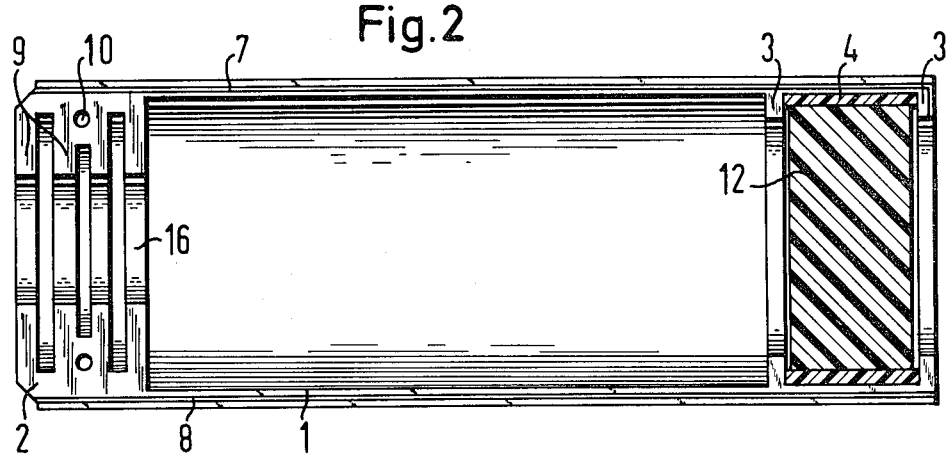
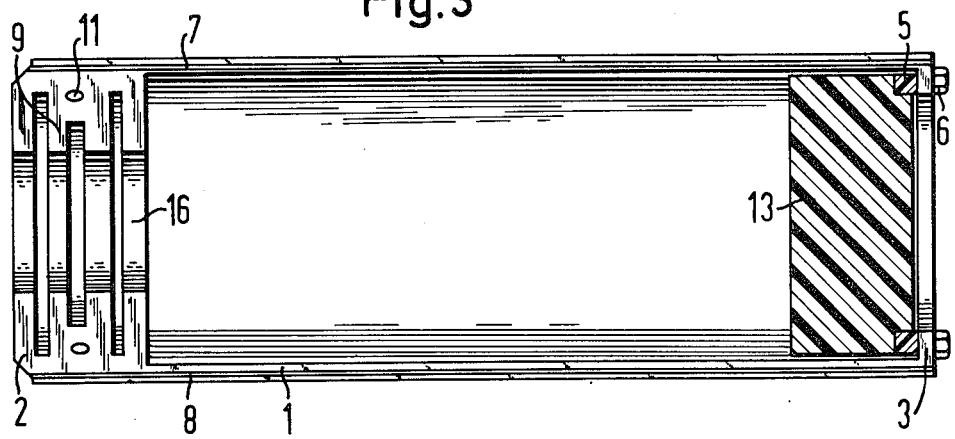

Fig. 4
Fig. 5
Fig. 6

CABLE SLEEVE

BACKGROUND OF THE INVENTION

1. Field of the Invention

This invention relates to a cable sleeve molded from a suitable thermosetting plastic to provide a releasable closure about a splice formed by joining end portions of respective cables.

2. Description of Prior Art

Cable sleeves formed by joining mating half portions are disclosed in German Auslegeschrift No. 1,930,655 where the two half portions are held together be screws. In another German Offenlegungsschrift 2,158,992 the two half portions forming a cable sleeve are held by slipping a wedge-shaped clamp over laterally protruding beads on the outer surface of the sleeve. Additionally, in German Offenlegungsschrift 2,219,721 a snap connector is used to hold the two half portions together. Under normal circumstances, the splice formed from the inserted cable is surrounded by a sealing compound. To prevent leakage of the sealing compound, a sealing element can be provided having laterally disposed plates as disclosed in German Gebrauchsmuster GM No. 7,003,652. German Gebrauchsmuster GM No. 7,149,349 discloses a deformable sealing ring located at the cable entry portion of the sleeve with the sealing ring being held against the cable under pressure by means of force applied through screws. Likewise, German Offenlegungsschrift No. 2,341,112 and U.S. Pat. No. 3,337,681 show other means by which the end portion of a cable sleeve can be sealed.

SUMMARY OF THE INVENTION

A cable sleeve as herein disclosed provides an inexpensive, readily manufactured split cable sleeve having a wide latitude of uses. The sleeve is simple in construction and forms a reliable sealing arrangement to prevent leakage of sealing compound used to encase a splice formed by joining cable ends. The sleeve can be readily installed with use of simple tools. The cable sleeve is made of a suitable thermosetting plastic and comprises two semi-circular half portions which when mated form an elongated cylindrical sleeve body. A plurality of sealing rings arranged perpendicular to the longitudinal axis of the sleeve are provided at each end of the sleeve through which is provided an opening for a cable. The solid plug or solid sealing element can also be provided to protect an exposed end of a cable which has not been spliced.

A major advantage of this invention is that the sealing element formed at the ends of the sleeve is an integral part of the sleeve body. Therefore, there can be no leakage between the outer peripheral edge of the sealing rings and the sleeve body since they are molded as one piece. A seal is only required about the cable opening and between the mating surfaces of each half portions. This seal can be achieved by using a suitable mastic or sealant. By providing the sealing rings as an integral portion of the sleeve, the user is assured that the rings maintain a parallel relationship and form a right angle with a longitudinal axis of the sleeve. Additionally, the sleeve is strengthened by the inclusion of the sealing rings in the end portion as well as providing longitudinally disposed mating flanges which serve to provide a means by which the two half portions are held together.

A sealing element of a sleeve can be provided with more than one cable opening and in varying diameters to accommodate a plurality of varying sized cables. With this configuration, the sleeve can be used to protect a cable spliced with more than one incoming or outgoing cable.

When several cables are to be enclosed within one sleeve, it is not always desirable to align the cable openings along a plane formed by the mating of the sleeve portions. In such a case, a three piece sealing element is used. The two sleeve portions form the outer portion for the sealing element and the inner portion of the element is formed by use of a separate insert. The cable openings are formed along the mating surfaces of the outer portion and the insert.

When a separated element is used to complete the inner portion of a sealing element, it is desirable to support the sealing ring portions of that insert with intermediate reinforcements between the rings.

A sealing element can also be made from two or more sealing element portions separate and apart from the sleeve. An advantage of using a separate element is that one universal sleeve can be used to contain a number of cable openings of varying diameters. The joining of the sealing element portion within a sleeve is similar to the sealing element used to close off the end of a sleeve.

When two sleeve portions are mated, a seal along the outer longitudinal mating surfaces can be perfected in a number of ways. One simple arrangement is to provide mating flange portions which protrude outwardly from the outer surface of the sleeve portions and which can be gripped and forced together using a suitable compression tool. Once together they can be held by a U-shaped clamp.

It is often desirable to structurally reinforce the splice with a formed sleeve from excessive externally applied forces. This can be accomplished by the use of suitable strapping means applied either externally to or within the sleeve. The strap has arms which attach to the cable on each side of the splice. The arms are then attached to a structural member and support therefrom. If shielded cable is being used, the external strapping means also provides a convenient structure to attach a grounding wire.

Once the splice has been enclosed within an appropriate sleeve, the sleeve may be filled with a non-hardenable or hardenable compound through an orifice opening in the body of the sleeve. Such an opening may be provided by merely marking the outer surface of the body and then requiring the user to drill out an opening or by providing a knock-out type opening where a small application of pressure creates an opening. Once the cavity within the sleeve has been filled, the opening may be closed with a plug and sealing compound. The plug in turn may be further held by providing a clamping band arranged around the outer surface of the sleeve.

BRIEF DESCRIPTION OF THE DRAWINGS

FIG. 1 is a plan view of a semi-circular sleeve portion having a cable opening at each end of the sleeve portion.

FIG. 2 is a plan view of a semi-circular sleeve portion where one end is provided with a full seal element.

FIG. 3 is a plan view of a semi-circular sleeve portion where one end is provided with a removable full seal element.

FIG. 4 is a perspective view of a semi-circular sleeve portion having an alternate sealing element at one end wherein a center portion is completed by use of a separate insert so as to provide a plurality of radially disposed openings for cables.

FIG. 5 is a detailed view of the separate sealing insert of the sleeve sealing element depicted in FIG. 4.

FIG. 6 is an end view depicting a sleeve having a plurality of cable openings formed by use of the insert shown in FIG. 4 and FIG. 5.

DETAILED DESCRIPTION OF THE INVENTION

Figure 7:
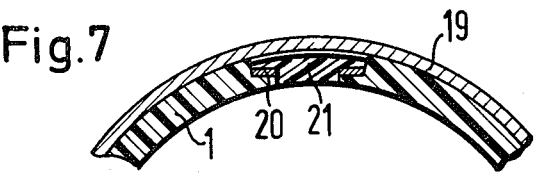
FIG. 7 is a cross-sectional view through a wall portion of the sleeve portion depicting a typical orifice opening for filling an interior cavity of a formed sleeve.
Figure 8:
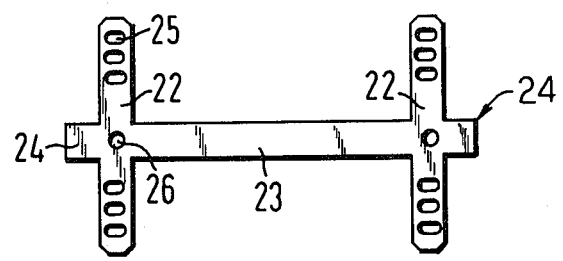
FIG. 8 is a plan view of a cable strap means for use internally or externally to structurally reinforce an enclosed splice and/or provide grounding means for shielded cable.
Figure 9:
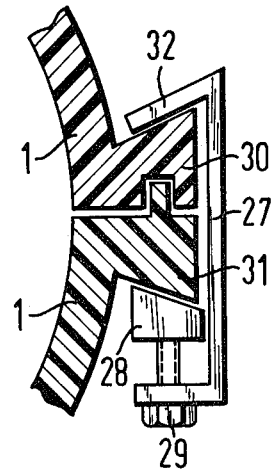
FIG. 9 is a cross-sectional view through the mating flange portions of the sleeve portion where the portions are being forced together by use of a suitable tool.

In FIG. 1 is shown an elongated, semi-circular cable sleeve portion 1 having a sealing element portion 2 formed as an integral part at each end of the sleeve portion 1. Through the sealing element portion 2 is a semi-circular cable opening 16. Along the longitudinal edges of the sleeve portion I is a tongue 7 and a groove 8.

A cylindrical-shaped cable sleeve is formed by mating two like elongated semi-circular sleeve portions 1. A cable opening 16 is formed by cutting semi-circular portions out of semi-circular ring portion or rib 9. The tongue 7 mates with the groove 8 in respective sleeve portions.

The sleeve portion 1 can also be provided with two radially disposed flange portions 3. When two sleeve portions are mated, a solid insertable sealing plug 12 may be supported therebetween and a seal formed by use of a sealing compound 4.

As shown in FIG. 3, the end of sleeve portion 1 may be also prepared to receive a solid insertable sealing plug 13 which is sealed by use of a sealing ring 5 which fits into a circumferent notch and is expanded by force applied by screws 6.

The sealing element portion 2 is formed having a plurality of semi-circular ring portions or ribs 9 and radially disposed along the longitudinal axis of the sleeve portion 1. When the two sleeve portions 1 are mated to form the cable sleeve, the semicircular ring portions 9 form a complete enclosure ring about a cable. To insure alignment of the ring portions 9, a hole 10 and 11 is provided at each end of each sleeve portion 1. Alignment is obtained by insertion of a suitable tool. These holes 10 and 11 also provide a convenient means to secure the cable sleeve to an external fixture.

Figures 4, 5, 6:
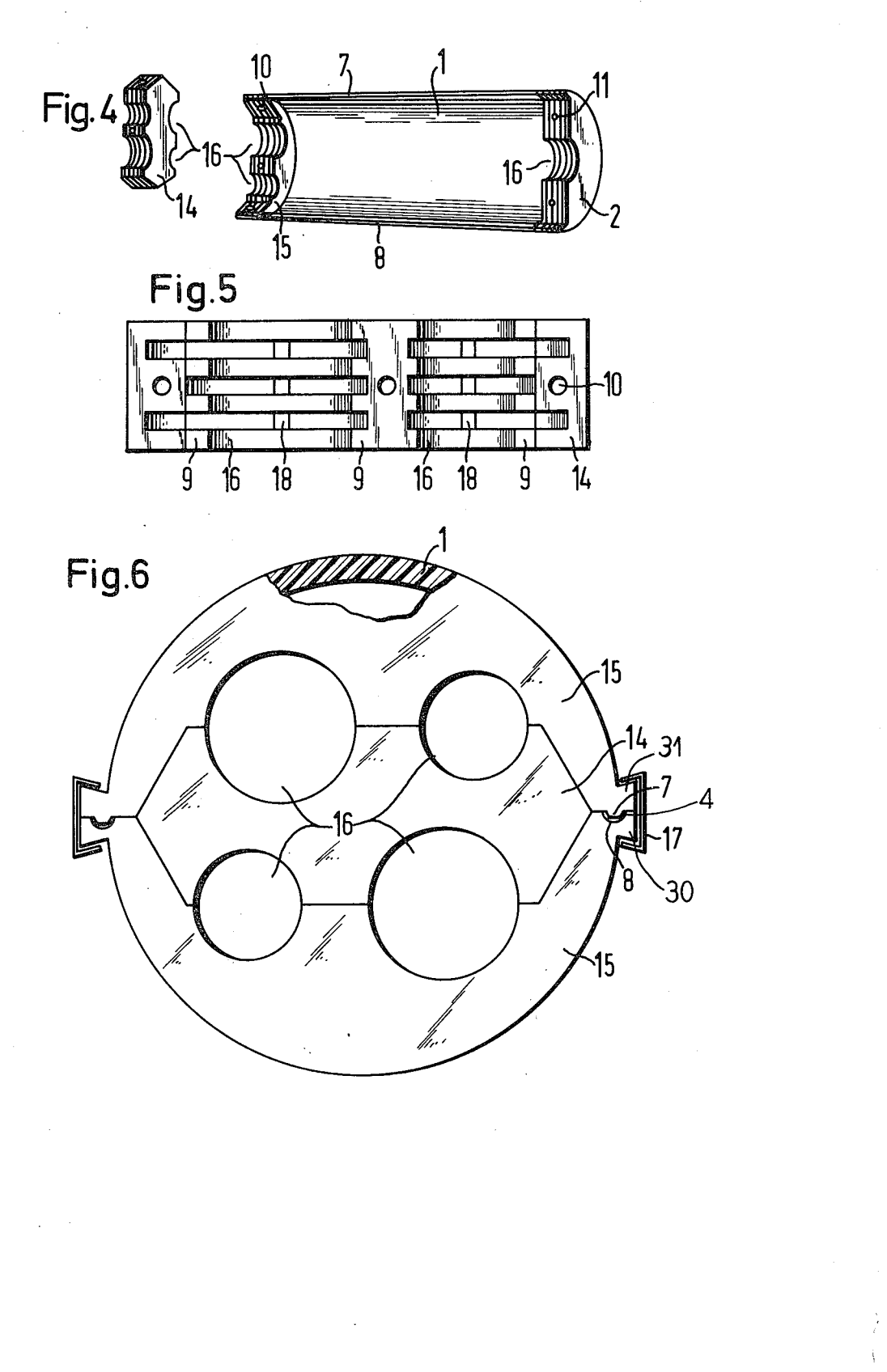

As shown in FIG. 4, the sleeve portion 1 can be provided with semi-circular sealing element portions 2 at one end and on the other end provided with a partial sealing element portion 15 where a plurality of cable openings 16 are provided. By use of a separate sealing insert portion 14 having like semicircular cable openings 16 which correspond with openings 16 in the sealing element portions 15, a plurality of the cable openings 16 is formed. Such a sleeve allows one cable to be slit into two or more cables. By use of the insert 14, the location of the cable opening 16 is not restricted to the mating plane formed by two mated sleeve portions 1.

The insert 14 is formed having a plurality of ring portions 9 separated and reinforced by a stiffening rib 18 in several locations.

As shown in FIG. 6, each sleeve portion 1 is formed having a closing flange portion 30 and 31. By use of a channel clamp 17, the sleeve portions 1 are so held to form a seal. The quality of this seal is improved by adding a sealing compound 4 into the groove 8. The use of the tongue 7 and the groove 8 also impedes any lateral movement between the sleeve portions 1 after joining.

As shown in FIG. 7, the sleeve portion 1 is provided with an opening for filling an inner cavity of the cable sleeve. When the inner cavity is filled, the opening in the cable sleeve portion 1 may be sealed by insertion of a cap 21 in the opening with a suitable sealing compound 20; the cap 21 is held in place by a band 19.

An accessory to the cable sleeve is a cable reinforcing strap 24 having an elongated center member 23 and four banding arms 22 having a plurality of holes 25. When used externally, the cable sleeve is positioned to align with the member 23 such that the band arms 22 extend beyond each end of the sleeve. The arms then can be formed around the exposed cable immediately adjacent to the outside end portions of the sleeve. The holes 25 provide a convenient means to secure the arms 22 about a cable and also provide means to support the strap from an external structure. Additionally, if a cable has a shield for grounding, the reinforcing strap 24 provides a convenient connection for a ground wire. The strap structurally reinforces the splice against excessive tensile or torsional force applied to the cable.

The strap 24 can also be used within the sleeve to support a splice. In this case, the strap 24 is so dimensioned to approximately equal the length of the cavity. The strap can be secured to the inside of the sleeve portion 1 with screws through a hole 26.

To facilitate the closing of the cable sleeve formed from the two sleeve portions 1, a clamp assembly 27 can be used. The clamp 27 is formed having an upper flange 32 to engage the closing flange portion 30 of the sleeve portion 1. Force is applied by rotation of a screw 29 threadedly engaged by a lower flange. The rotation causes a wedge 28 to be forced against a closing flange portion 31 of the lower sleeve portion 1.

While various modifications may be suggested by those versed in the art, it should be appreciated that we wish to embody within the scope of the patent warranted herein, all such modifications as reasonable and properly come within the scope of our contribution to the art.

We claim as our invention:

1. A split cable sleeve comprising two mating continuous walled sleeve portions defining an inner cavity and having sealing means disposed at at least one end thereof, said sealing means including a plurality of axially displaced radially inwardly extending ribs formed integrally with the mating sleeve portions, said ribs in each of said sleeve portions defining aligned congruent semicircular cable entrance openings of equal radii, wherein the walls of said sleeve portions intermediate said ribs are completely continuous and wherein each of the ribs is adapted to engage at least a portion of a cable to be positioned through the cable entrance openings and the said inner cavity; wherein said cable entrance openings defined by said ribs are offset relative to the splitting plane and wherein said sealing means further comprises a sealing element segment including a plurality of axially displaced ribs adapted to mate with the axially displaced ribs of the respective cable sleeve portions, the ribs on said sealing element segment cooperating with the ribs on the respective cable sleeve portions to define cable entrance openings aligned with openings on adjacent ribs having a diameter equal to the diameter of the cables to be positioned through the said aligned openings.

2. A split cable sleeve comprising two mating continuous walled sleeve portions defining an inner cavity and having sealing means disposed at at least one end thereof, said sealing means including a plurality of axially displaced radially inwardly extending ribs formed integrally with the mating sleeve portions, said ribs in each of said sleeve portions defining aligned congruent semicircular cable entrance openings of equal radii, wherein the walls of said sleeve portions intermediate said ribs are completely continuous and wherein each of the ribs is adapted to engage at least a portion of a cable to be positioned through the cable entrance openings and the said inner cavity; wherein the cable entrance openings defined by said ribs are offset relative to the splitting plane and wherein said sealing means further comprises a sealing element segment including a plurality of axially displaced ribs adapted to mate with the axially displaced ribs of the respective cable sleeve portions, the ribs on said sealing element segment cooperating with the ribs on the respective cable sleeve portions to define cable entrance openings aligned with openings on adjacent ribs having a diameter equal to the diameter of the cables to be positioned through the said aligned openings; wherein the mating cable sleeve portions are further provided with mutually cooperating tongues and grooves extending about the respective mating perimeters thereof and wherein a sealing material is disposed therebetween.

3. A split cable sleeve comprising two mating continuous walled sleeve portions defining an inner cavity and having sealing means disposed at at least one end thereof, said sealing means including a plurality of axially displaced radially inwardly extending ribs formed integrally with the mating sleeve portions, said ribs in each of said sleeve portions defining aligned congruent semicircular cable entrance openings of equal radii, wherein the walls of said sleeve portions intermediate said ribs are completely continuous and wherein each of the ribs is adapted to engage at least a portion of a cable to be positioned through the cable entrance openings and the said inner cavity; wherein the cable entrance openings defined by said ribs are offset relative to the splitting plane and wherein said sealing means further comprises a sealing element segment including a plurality of axially displaced ribs adapted to mate with the axially displaced ribs of the respective cable sleeve portions, the ribs on said sealing element segment cooperating with the ribs on the respective cable sleeve portions to define cable entrance openings aligned with openings on adjacent ribs having a diameter equal to the diameter of the cables to be positioned through the said aligned openings; wherein the mating cable sleeve portions are further provided with mutually cooperating tongues and grooves extending about the respective mating perimeters thereof and wherein a sealing material is disposed therebetween; wherein said mating cable sleeve portions are maintained to tightly sealed engagement with one another by means of clamping means engaging each such portion.

* * * * *